US009628519B2

(12) United States Patent
Tang et al.

(10) Patent No.: US 9,628,519 B2
(45) Date of Patent: *Apr. 18, 2017

(54) CALL PROCESSING METHOD AND CONTROL APPARATUS, AUTOMATIC CALL DISTRIBUTION APPARATUS, AND AGENT TERMINAL

(71) Applicant: Huawei Technologies Co., Ltd., Shenzhen, Guangdong (CN)

(72) Inventors: Zhaohui Tang, Nanjing (CN); Sining Wei, Shenzhen (CN); Rongjun Huang, Nanjing (CN); Tongbing Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,814

(22) Filed: Apr. 11, 2016

(65) Prior Publication Data

US 2016/0226924 A1    Aug. 4, 2016

Related U.S. Application Data

(63) Continuation of application No. 14/325,000, filed on Jul. 7, 2014, now Pat. No. 9,344,571, which is a
(Continued)

(30) Foreign Application Priority Data

Mar. 29, 2012    (CN) .......................... 2012 1 0088209

(51) Int. Cl.
*H04M 3/51*    (2006.01)
*H04L 29/06*    (2006.01)
(Continued)

(52) U.S. Cl.
CPC ...... *H04L 65/1066* (2013.01); *H04L 65/1046* (2013.01); *H04L 65/1069* (2013.01);
(Continued)

(58) Field of Classification Search
CPC ............. H04L 65/1046; H04L 65/1066; H04L 65/1069; H04L 65/80; H04L 69/24;
(Continued)

(56) References Cited

U.S. PATENT DOCUMENTS 8,526,576 B1    9/2013    Deich et al.
9,344,571 B2 *  5/2016    Tang ................... H04M 3/5141
(Continued)

FOREIGN PATENT DOCUMENTS

CN    101098243 A    1/2008
CN    101123612 A    2/2008
(Continued)

OTHER PUBLICATIONS

J. Haluska, et al., "Considerations for Information Services and Operator Services Using SIP", Network Working Group, Aug. 15, 2011, 115 pages.
(Continued)

*Primary Examiner* — Harry S Hong

(57) ABSTRACT

Embodiments of the present invention provide a call processing method and control apparatus, an automatic call distribution apparatus, and an agent terminal. The call processing method, which executed by the call control apparatus, includes: receiving, a processing request for a call, and extracting a media connection address and a media capability of an automatic call distribution apparatus; performing, media negotiation based on a media capability of an agent terminal and the automatic call distribution apparatus; and establishing, a media session between the agent terminal and the automatic call distribution apparatus according to a
(Continued)

media connection address of the agent terminal, the media connection address of the automatic call distribution apparatus, and a media negotiation result. The embodiments of the present invention can reduce the processing load of an entire cloud server, which effectively ensures the service quality of a call center constructed based on cloud computing technologies.

6 Claims, 7 Drawing Sheets

Related U.S. Application Data continuation of application No. PCT/CN2012/085313, filed on Nov. 27, 2012.

(51) Int. Cl.
*H04M 7/00* (2006.01)
*H04M 3/523* (2006.01)
(52) U.S. Cl.
CPC .......... *H04L 69/24* (2013.01); *H04M 3/5141* (2013.01); *H04M 3/5183* (2013.01); *H04M 3/5191* (2013.01); *H04M 3/523* (2013.01); *H04M 7/006* (2013.01); *H04L 65/80* (2013.01)
(58) Field of Classification Search
CPC ............. H04M 3/5141; H04M 3/5183; H04M 3/5191; H04M 3/523; H04M 7/006
USPC ............. 379/201.01, 265.01, 265.02, 265.09
See application file for complete search history.

(56) References Cited

U.S. PATENT DOCUMENTS

| | | | |
|---|---|---|---|
| 2004/0120502 | A1 | 6/2004 | Strathmeyer et al. |
| 2008/0045209 | A1 | 2/2008 | Mo et al. |
| 2008/0144610 | A1 | 6/2008 | Kakiuchi |
| 2008/0259909 | A1 | 10/2008 | Runeson et al. |
| 2008/0281971 | A1 | 11/2008 | Leppanen et al. |
| 2009/0190744 | A1 | 7/2009 | Xie et al. |
| 2011/0010173 | A1 | 1/2011 | Scott et al. |

FOREIGN PATENT DOCUMENTS

| | | |
|---|---|---|
| CN | 101207662 A | 6/2008 |
| CN | 102025715 A | 4/2011 |
| CN | 102158612 A | 8/2011 |
| CN | 102611809 A | 7/2012 |
| EP | 1 905 209 B1 | 6/2010 |

OTHER PUBLICATIONS

Srikumar Venugopal, et al., "Auto-scaling Emergency Call Centers using Cloud Resources to Handle Disasters", IEEE, Jun. 6, 2011, 9 pages.

"40, 32, 24, 16 kbit/s Adaptive Differential Pulse Code Modulation (ADPCM), Annex A: Extensions of Recommendation G.726 For Use with Uniform-Quantized Input and Output", ITU-T Recommendation G.726—Annex A, Nov. 1994, 8 pages.

"Pulse code modulation (PCM) of voice frequencies, Appendix II: A comfort noise payload definition for ITU-T G.711 use in packet-based multimedia communication systems", ITU-T Recommendation G.711—Appendix II, Feb. 2000, 17 pages.

* cited by examiner

CALL PROCESSING METHOD AND CONTROL APPARATUS, AUTOMATIC CALL DISTRIBUTION APPARATUS, AND AGENT TERMINAL

CROSS-REFERENCE TO RELATED APPLICATION

This application is a continuation of U.S. patent application Ser. No. 14/325,000, filed on Jul. 7, 2014, which is a continuation of International Application No. PCT/CN2012/085313, filed on Nov. 27, 2012. The International Application claims priority to Chinese Patent Application No. 201210088209.9, filed on Mar. 29, 2012. The afore-mentioned patent applications are hereby incorporated by reference in their entireties.

TECHNICAL FIELD

The present invention relates to call center technologies, and in particular, to a call processing method and control apparatus, an automatic call distribution apparatus, and an agent terminal.

BACKGROUND

With development of technologies such as distributed computing, virtual computing, and flexible resource management, cloud computing has become a new service mode. Desktop cloud is one of cloud computing service modes, featuring advantages such as high information security, easy maintenance, being advantageous for energy saving and emission reduction, environmental protection, and mobile office. This cloud computing service mode centralizes processing capabilities of personal terminals (such as a central processing unit, CPU and a hard disk) onto a cloud computing resource center (such as a network computing server). In this case, the personal terminals become thin clients (TCs). The cloud computing resource center provides a virtual "computer" for each TC. In this way, all thin clients use shared resources, computing resources are dynamic and flexible, and resources are allocated on demand.

Though the desktop cloud technology has the foregoing advantages, the industry has not developed a feasible solution for implementing a call center based on the desktop cloud technology. A main reason is that a cloud computing technical architecture centralizes massive computing tasks onto a cloud server for processing. In addition to processing various cloud operation data between an agent terminal and the cloud server, the cloud server also needs to perform various streaming media processing, for example, but not limited to, VoIP (Voice over IP) voice codec processing, digital signal de-jittering, and echo and delay control, for an incoming call directed to the agent terminal. Therefore, softphone processing logic must be configured on the cloud server. In a call center, the streaming media processing tasks are intensive, which certainly causes excessive overload of the cloud server and affect the overall service quality of the call center.

SUMMARY

In view of this, it is necessary to provide a call processing method to effectively reduce the streaming media processing load of a cloud server during call processing.

Meanwhile, a call control apparatus is provided to effectively reduce the streaming media processing load of the cloud server during call processing.

Meanwhile, an automatic call distribution apparatus is provided to effectively reduce the streaming media processing load of the cloud server during call processing.

Meanwhile, an agent terminal is provided to effectively reduce the streaming media processing load of the cloud server during call processing.

According to an aspect of the present invention, a call processing method is provided and includes:

receiving, by a call control apparatus, a processing request for a call, where the processing request is distributed by an automatic call distribution apparatus, and extracting a media connection address and a media capability of the automatic call distribution apparatus carried in the processing request;

performing, by the call control apparatus, media negotiation based on a media capability of an agent terminal and the media capability of the automatic call distribution apparatus; and establishing, by the call control apparatus, a media session between the agent terminal and the automatic call distribution apparatus according to a media connection address of the agent terminal, the media connection address of the automatic call distribution apparatus, and a media negotiation result, so that the agent terminal processes the call.

According to an aspect of the present invention, a call processing method is provided and includes:

distributing, by an automatic call distribution apparatus, a processing request for a call to a call control apparatus, where the processing request carries a media connection address and a media capability of the automatic call distribution apparatus;

receiving, by the automatic call distribution apparatus, a media connection address of an agent terminal returned by the call control apparatus and a media negotiation result determined by the call control apparatus by performing media negotiation based on a media capability of the agent terminal and the media capability of the automatic call distribution apparatus; and establishing, by the automatic call distribution apparatus, a media session with the agent terminal according to the media connection address of the agent terminal and the media negotiation result so that the agent terminal processes the call.

According to an aspect of the present invention, a call processing method is provided and includes:

receiving, by an agent terminal, a media connection address of an automatic call distribution apparatus sent by a call control apparatus and a media negotiation result determined by the call control apparatus by performing media negotiation based on a media capability of the agent terminal and a media capability of the automatic call distribution apparatus; and establishing, by the agent terminal, a media session with the automatic call distribution apparatus according to the media connection address of the automatic call distribution apparatus and the media negotiation, and processing a call distributed by the automatic call distribution apparatus by using the media session.

According to an aspect of the present invention, a call control apparatus is provided and includes:

an extracting module, configured to receive a processing request for a call, where the processing request is distributed by an automatic call distribution apparatus, and extract a media connection address and a media capability of the automatic call distribution apparatus carried in the processing request;

a negotiating module, configured to perform media negotiation based on a media capability of the agent terminal and the media capability of the automatic call distribution apparatus; and an establishing module, configured to establish a media session between the agent terminal and the automatic call distribution apparatus according to a media connection address of the agent terminal, the media connection address of the automatic call distribution apparatus, and a media negotiation result, so that the agent terminal processes the call.

According to an aspect of the present invention, an automatic call distribution apparatus is provided and includes:

a sending module, configured to distribute a processing request for a call to a call control apparatus, where the processing request carries a media connection address and a media capability of the automatic call distribution apparatus;

a receiving module, configured to receive a media connection address of an agent terminal returned by the call control apparatus and a media negotiation result determined by the call control apparatus by performing media negotiation based on a media capability of the agent terminal and the media capability of the automatic call distribution apparatus; and an establishing module, configured to establish a media session with the agent terminal according to the media connection address of the agent terminal and the media negotiation result so that the agent terminal processes the call.

According to an aspect of the present invention, an agent terminal is provided and includes:

a receiving module, configured to receive a media connection address of an automatic call distribution apparatus sent by a call control apparatus and a media negotiation result determined by the call control apparatus by performing media negotiation based on a media capability of the agent terminal and a media capability of the automatic call distribution apparatus; and a processing module, configured to establish a media session with the automatic call distribution apparatus according to the media connection address of the automatic call distribution apparatus and the media negotiation and process a call distributed by the automatic call distribution apparatus by using the media session.

In the technical solutions provided in the embodiments of the present invention, a call control apparatus located on a cloud server is responsible for performing media negotiation based on a media capability of an agent terminal and a media capability of an automatic call distribution apparatus, and establishing a media session between the agent terminal and the automatic call distribution apparatus according to media connection addresses of the agent terminal and the automatic call distribution apparatus and a media negotiation result. After the media session is established, the automatic call distribution apparatus directly sends streaming media data related to the call to the agent terminal. The agent terminal performs streaming media processing such as encoding and decoding. Therefore, in the technical solutions provided in the embodiments of the present invention, streaming media processing such as encoding and decoding does not need to be performed on the call control apparatus, which significantly reduces the processing load of the entire cloud server and effectively ensures the service quality of a call center constructed based on cloud computing technologies.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
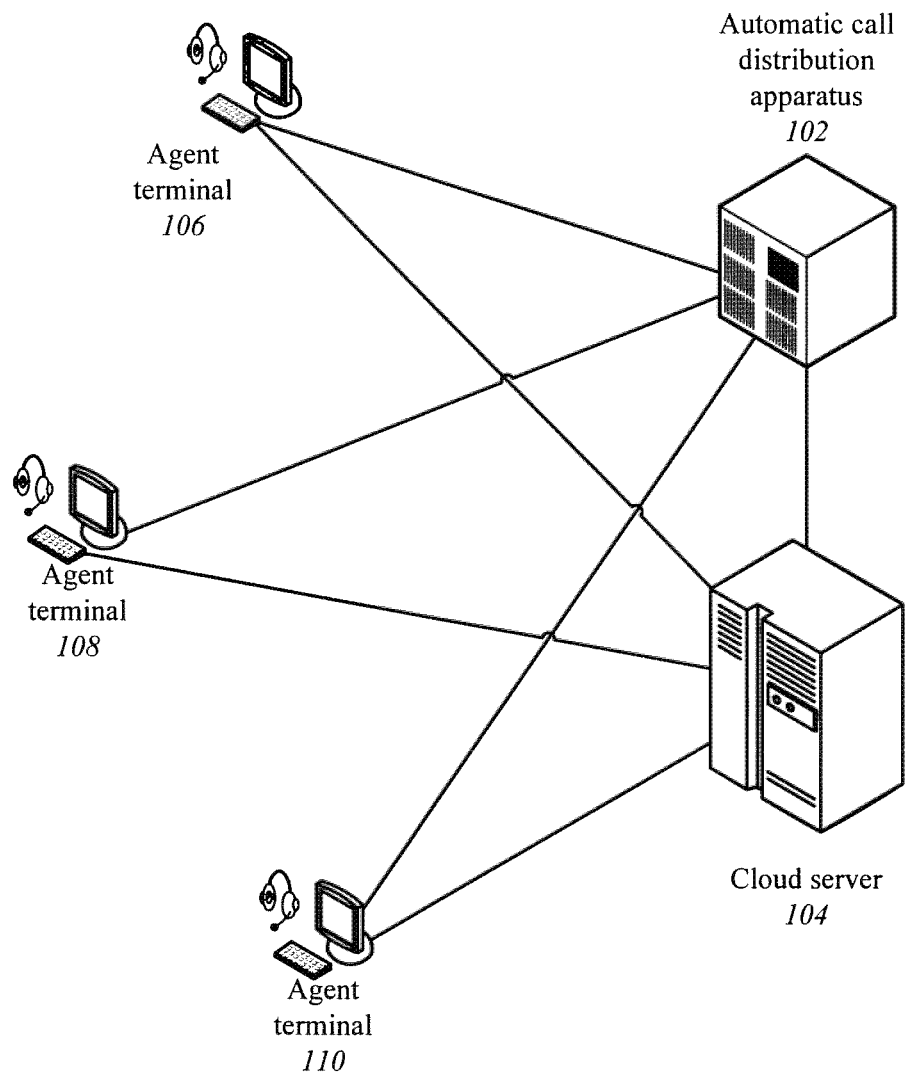
FIG. 1 is a schematic diagram of a network structure of a call center according to an embodiment of the present invention.

FIG. 1 is a schematic diagram of a network structure of a call center 100 according to an embodiment of the present invention. As shown in FIG. 1, the call center 100 includes an automatic call distribution apparatus 102, a cloud server 104, and agent terminals 106, 108, and 110.

The call center 100 is constructed based on a desktop cloud technology. The agent terminals 106, 108, and 110 are thin clients and each agent terminal may connect to and communicate with the cloud server 104 by using a local area network. Surely, each agent terminal may also connect to and communicate with the cloud server 104 by using a wide area network such as the Internet, for example, a SOHO (Small Office Home Office) agent terminal. A person skilled in the art should understand though only three agent terminals, namely, agent terminals 106, 108, and 110, are displayed in FIG. 1, the number of agent terminals may be set during specific implementation according to specific requirements, for example, but not limited to, the scale required by a call center.

Multiple call control apparatuses (three in this embodiment), corresponding to the agent terminals 106, 108, and 110 on a one-to-one basis, are arranged on the cloud server 104. Each call control apparatus registers with the automatic call distribution apparatus 102 so that the automatic call distribution apparatus 102 distributes a processing request for an incoming call to a registered call control apparatus. For example, each call control apparatus is a virtual machine (VM) allocated by the cloud server 104 to an agent terminal corresponding to the call control apparatus, namely, the virtual computer of the agent terminal on the cloud server. Cloud communication between the virtual computer and the agent terminal is implemented by using protocols such as the Independent Computing Architecture (ICA) protocol, Remote Desktop Protocol (RDP), and/or Personal Computer over Internet Protocol (PCoIP).

During running, the automatic call distribution apparatus 102 is configured to initiate a processing request for an incoming call to the cloud server 104 when the incoming call is detected. The processing request carries a media connection address and a media capability of the automatic call distribution apparatus 102. During specific implementation, the automatic call distribution apparatus 102 selects a call control apparatus from the registered call control apparatuses based on an automatic call distribution (ACD) technology and distributes the processing request for the call to the call control apparatus.

After the processing request arrives at the cloud server 104, the selected call control apparatus processes the processing request. The call control apparatus receives the processing request and extracts the media connection address and media capability of the automatic call distribution apparatus 102 carried in the processing request. Then, the call control apparatus performs media negotiation based on the media capability of the agent terminal corresponding to the call control apparatus and the media capability of the automatic call distribution apparatus 102, or the call control apparatus sends the media connection address and media capability of the automatic call distribution apparatus 102 to the agent terminal corresponding to the call control apparatus, and then the agent terminal performs media negotiation and returns a media negotiation result to the call control apparatus. After that, the call control apparatus establishes a media session between the agent terminal and the automatic call distribution apparatus 102 according to the media connection address of the agent terminal corresponding to the call control apparatus, the media connection address of the automatic call distribution apparatus 102, and the media negotiation result, so that the agent terminal directly processes the call.

It should be noted that during specific implementation, the call may be either a voice call or a multimedia call including a video. The automatic call distribution apparatus 102 further includes functions related to a computer telephony integration (CTI) device.

Operations performed by the automatic call distribution apparatus 102, the call control apparatuses on the cloud server 104, and the agent terminals 106, 108, and 110 are hereinafter described in detail.

Figure 2:
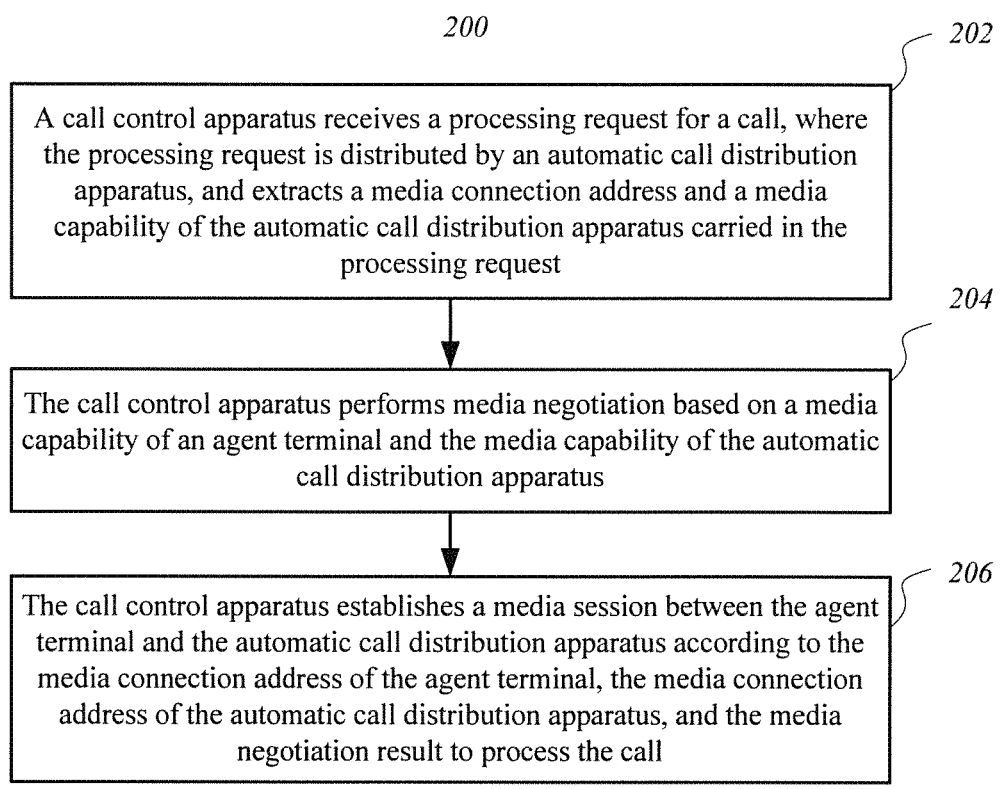
FIG. 2 is an exemplary flowchart of a call processing method according to an embodiment of the present invention.

FIG. 2 is an exemplary flowchart of a call processing method 200 according to an embodiment of the present invention.

Step 202: A call control apparatus receives a processing request for a call, where the processing request is distributed by an automatic call distribution apparatus, and extracts a media connection address and a media capability of the automatic call distribution apparatus carried in the processing request.

Specifically, when the call is controlled by using the Session Initiation Protocol (SIP), the processing request may be implemented by using an Invite message in the SIP. The media connection address and media capability may be described by using, for example, but not limited to, the Session Description Protocol (SDP). The media connection address may include, for example, but not limited to, an IP (Internet Protocol) address and a port number of the automatic call distribution apparatus. The media capability may include multiple media capability parameters, for example, but not limited to, an encoding and decoding standard (such as G.711 or G.723), a media format, and a transmission protocol type (such as the Real-time Transport Protocol (RTP) supported by the automatic call distribution apparatus.

Step 204: The call control apparatus performs media negotiation based on a media capability of an agent terminal and the media capability of the automatic call distribution apparatus.

Specifically, when the call control apparatus performs the media negotiation, the call control apparatus may store the media connection address and media capability of an agent terminal corresponding to the call control apparatus in advance, and may also obtain the media connection address and media capability of the agent terminal from the agent terminal corresponding to the call control apparatus before performing the media negotiation based on the media capability of the agent terminal and the media capability of the automatic call distribution apparatus. The media connection address of the agent terminal may include, but is not limited to, an IP address and a port number of the agent terminal. The media capability of the agent terminal may include multiple media capability parameters, for example, but not limited to, an encoding and decoding standard, a media format, and a transmission protocol type supported by the agent terminal.

When the call control apparatus performs the media negotiation, for each media capability parameter, the call control apparatus calculates an intersection between a value of the media capability parameter in the media capability of the agent terminal and a value of the media capability parameter in the media capability of the automatic call distribution apparatus, and uses the intersection as a value of the media capability parameter in a media negotiation result. Therefore, the media negotiation result includes at least one media capability parameter. The value of each media capability parameter is an intersection between the value of the media capability parameter in the media capability of the agent terminal and the value of the media capability parameter in the media capability of the automatic call distribution apparatus.

Optionally, step 204 may be further implemented specifically as follows: The call control apparatus performs the media negotiation based on the media capability of the agent terminal and the media capability of the automatic call distribution apparatus by using the agent terminal. That is, the call control apparatus sends the media connection address and media capability of the automatic call distribution apparatus to the agent terminal; the agent terminal performs the media negotiation based on the media capability of the agent terminal and the media capability of the automatic call distribution apparatus and returns the media negotiation result to the call control apparatus. In this case, the media connection address of the agent terminal may be stored on the call control apparatus in advance or be returned to the call control apparatus with the media negotiation result.

When the agent terminal performs the media negotiation, for each media capability parameter, the agent terminal calculates an intersection between a value of the media capability parameter in the media capability of the agent terminal and a value of the media capability parameter in the media capability of the automatic call distribution apparatus, and uses the intersection as a value of the media capability parameter in the media negotiation result. Therefore, the media negotiation result includes at least one media capability parameter. The value of each media capability parameter is an intersection between the value of the media capability parameter in the media capability of the agent terminal and the value of the media capability parameter in the media capability of the automatic call distribution apparatus.

Step 206: The call control apparatus establishes a media session between the agent terminal and the automatic call distribution apparatus according to the media connection address of the agent terminal, the media connection address of the automatic call distribution apparatus, and the media negotiation result, so that the agent terminal processes the call.

Specifically, when the call control apparatus performs the media negotiation, a process of establishing a media session is as follows: The call control apparatus sends the media connection address of the agent terminal and the media negotiation result to the automatic call distribution apparatus to notify the automatic call distribution apparatus to initiate, according to the media negotiation result, a media session request to the agent terminal for which the media connection address is configured. In addition, the call control apparatus sends the media connection address of the automatic call distribution apparatus and the media negotiation result to the agent terminal to notify the agent terminal to accept the media session request that is initiated, by the automatic call distribution apparatus for which the media connection address is configured, to the agent terminal according to the media negotiation result, so that the media session is established with the automatic call distribution apparatus.

When the agent terminal performs the media negotiation, a process of establishing a media session is as follows: The call control apparatus sends the media connection address of the agent terminal and the media negotiation result to the automatic call distribution apparatus to notify the automatic call distribution apparatus to initiate, according to the media negotiation result, a media session request to the agent terminal for which the media connection address is configured. In this case, the agent terminal has performed the media negotiation by itself; therefore, the call control apparatus does not need to send the media connection address of the automatic call distribution apparatus and the media negotiation result to the agent terminal again. The agent terminal automatically accepts the media session request that is initiated, by the automatic call distribution apparatus for which the media connection address is configured, to the agent terminal according to the media negotiation result, so that the media session is established with the automatic call distribution apparatus.

After the media session is established, the agent terminal performs processing (such as streaming media processing) for the call directly by using the media session. Except for some control operations, the call control apparatus does not need to participate in a processing process.

During specific implementation, the method 200 may further include the following:

The call control apparatus controls the media session according to a control request for the call, where the control request is sent by the agent terminal. For example, when the agent terminal sends a control request for terminating the call, the call control apparatus will terminate the media session. During specific implementation, the control request may be transferred by cloud communication between the agent terminal and the call control apparatus. Specifically, a process of terminating the media session may be as follows: When an agent representative performs an operation of terminating the call (for example, the agent representative hangs up), the agent terminal terminates the media session and sends the control request for terminating the call to the call control apparatus. Then, the call control apparatus notifies the automatic call distribution apparatus to terminate the media session. If the call is controlled based on SIP, when receiving the control request from the agent terminal for terminating the call, the call control apparatus may send a ReInvite message to the automatic call distribution apparatus to notify the automatic call distribution apparatus to terminate the media session. In this case, the ReInvite message carries SDP parameters such as sendonly or inactive. In this way, after receiving the ReInvite message, the automatic call distribution apparatus terminates the media session. In this case, the SIP session between the call control apparatus and the automatic call distribution apparatus is not terminated. Surely, the call control apparatus may also send a Bye message to the automatic call distribution apparatus to terminate the media session. In this way, after receiving the Bye message, the automatic call distribution apparatus terminates the media session. In this case, the SIP session between the call control apparatus and the automatic call distribution apparatus is terminated.

During specific implementation, the method 200 may further include the following:

The call control apparatus registers with the automatic call distribution apparatus.

During specific implementation, the method 200 may further include the following:

When detecting that the agent terminal is abnormal, the call control apparatus notifies the automatic call distribution apparatus to transfer a preset media stream to a calling user terminal of the call to play preset media (such as waiting music), and deregisters from the automatic call distribution apparatus. In this way, when distributing a new incoming call later, the automatic call distribution apparatus does not distribute the new incoming call to a call control apparatus corresponding to the abnormal agent terminal.

In the technical solution provided in this embodiment of the present invention, the call control apparatus located on the cloud server is responsible for performing media negotiation based on the media capability of the agent terminal and the media capability of the automatic call distribution apparatus, and establishing a media session between the agent terminal and the automatic call distribution apparatus according to the media connection addresses of the agent terminal and the automatic call distribution apparatus and the media negotiation result. After the media session is established, the automatic call distribution apparatus sends directly streaming media data related to the call to the agent terminal. The agent terminal performs streaming media processing such as encoding and decoding. Therefore, in the technical solution provided in this embodiment of the present invention, streaming media processing such as encoding and decoding does not need to be performed on the call control apparatus. In other words, softphone-related processing logic on the cloud server does not need to perform any task such as streaming media data processing, but reserves only call control functions such as media negotiation. Tasks such as streaming media data processing in the softphone-related processing logic are transferred to and implemented by the agent terminal. In this way, the processing load of the entire cloud server can be significantly reduced, which effectively ensures the service quality of a call center constructed based on cloud computing technologies. Meanwhile, as compared with a virtual audio card of the cloud server, a physical audio card of the agent terminal has the higher streaming media processing efficiency. If the cloud server undertakes call processing tasks, the cloud server needs to implement processes such as re-sampling and encoding in many solutions. In addition, data related to a voice call must be transmitted on a path where cloud communication data is transmitted. A remote data transmitting/receiving and processing unit of the cloud server has great pressure. If the agent terminal directly processes a call, the processes such as re-sampling and encoding are not required and the remote data transmitting/receiving and processing unit of the cloud server needs to process only data related to cloud communication and its pressure is greatly reduced. The agent terminal and automatic call distribution apparatus directly establish a media session to process a call without requiring the cloud server to perform forwarding processing, which can reduce the network bandwidth pressure between the cloud server and the agent terminal, decrease the frequency of voice data loss caused by bandwidth contention, and improve voice quality. After the media session is established, the processing of the call is not affected even if the call control apparatus is unavailable due to a fault of the cloud server because the media session is directly established between the agent terminal and the automatic call distribution apparatus without using the call control apparatus. In addition, cloud communication often uses the Transmission Control Protocol (TCP) as a transport-layer protocol, whereas a media session often uses the User Datagram Protocol (UDP) as a transport-layer protocol. Compared with TCP, UDP enables faster connection establishment and therefore provides a shorter delay during a call.

Figure 3:
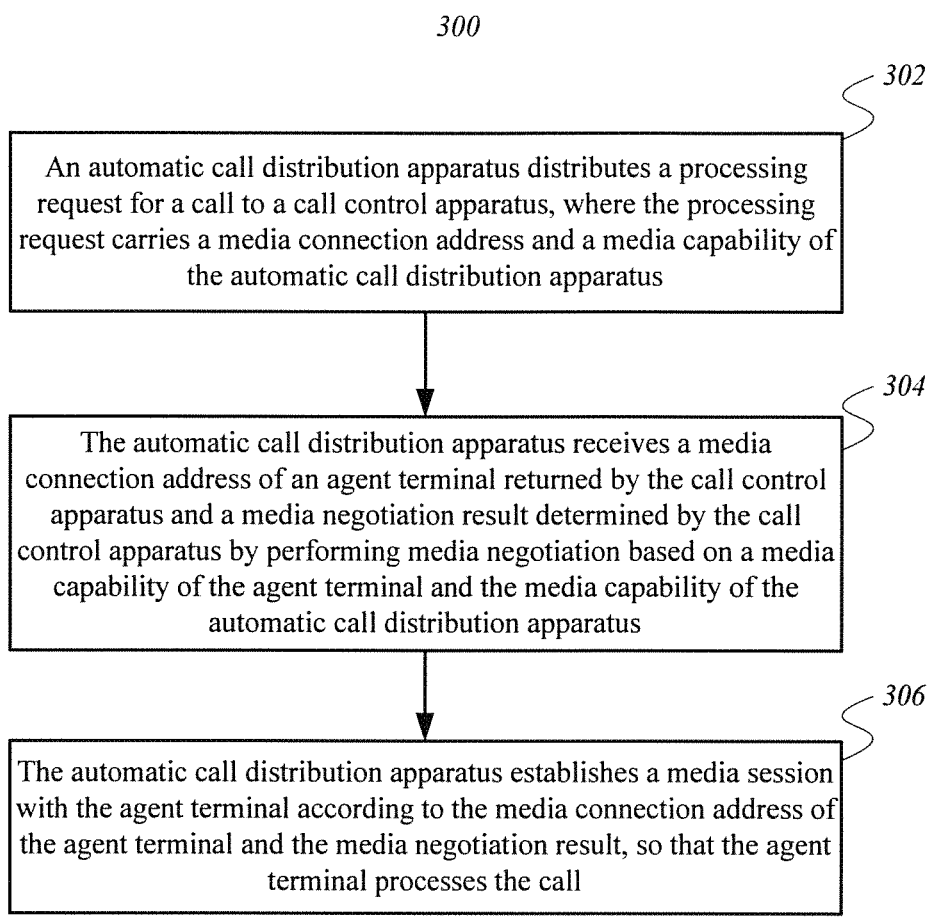
FIG. 3 is an exemplary flowchart of a call processing method according to an embodiment of the present invention.

FIG. 3 is an exemplary flowchart of a call processing method 300 according to an embodiment of the present invention.

Step 302: An automatic call distribution apparatus distributes a processing request for a call to a call control apparatus, where the processing request carries a media connection address and a media capability of the automatic call distribution apparatus.

During specific implementation, the distributing, by an automatic call distribution apparatus, a processing request for a call to a call control apparatus, specifically includes: when detecting an incoming call, distributing, by the automatic call distribution apparatus, a processing request for the call to the call control apparatus. Specifically, the automatic call distribution apparatus selects a call control apparatus from registered call control apparatuses based on an automatic call distribution technology, and distributes the processing request for the call to the call control apparatus.

Step 304: The automatic call distribution apparatus receives a media connection address of an agent terminal returned by the call control apparatus and a media negotiation result determined by the call control apparatus by performing media negotiation based on a media capability of the agent terminal and the media capability of the automatic call distribution apparatus.

During specific implementation, step 304 may be further implemented specifically as follows: The automatic call distribution apparatus receives the media connection address of the agent terminal returned by the call control apparatus and the media negotiation result that is determined by the agent terminal by performing the media negotiation based on the media capability of the agent terminal and the media capability of the automatic call distribution apparatus and is returned by the call control apparatus. Specifically, the automatic call distribution apparatus receives the media connection address of the agent terminal and the media negotiation result returned by the call control apparatus. The media negotiation result is determined by the agent terminal by performing the media negotiation according to the media capability of the agent terminal and the media capability of the automatic call distribution apparatus. After the media negotiation result is determined, the agent terminal returns the media negotiation result to the automatic call distribution apparatus by using the call control apparatus.

Step 306: The automatic call distribution apparatus establishes a media session with the agent terminal according to the media connection address of the agent terminal and the media negotiation result, so that the agent terminal processes the call. The process of establishing the media session is described in detail in step 206 of the method 200, and therefore is not further described herein.

During specific implementation, the method 300 may further include the following:

The automatic call distribution apparatus controls the media session according to a control request of a calling user terminal for the call. For example, when a calling user sends a control request for terminating the call by using the calling terminal (for example, the calling user hangs up), the automatic call distribution apparatus terminates the media session. Specifically, when the calling user performs an operation of terminating the call (for example, the calling user hangs up), the automatic call distribution apparatus terminates the media session and notifies the call control apparatus to instruct the agent terminal to terminate the media session. Then, the call control apparatus notifies the agent terminal to terminate the media session. If the call is controlled based on SIP, after terminating the media session, the automatic call distribution apparatus may send a ReInvite message to notify the call control apparatus to instruct the agent terminal to terminate the media session. In this case, the ReInvite message carries SDP parameters such as sendonly or inactive. In this way, after receiving the ReInvite message, the call control apparatus notifies the agent terminal to terminate the media session. In this case, the SIP session between the call control apparatus and the automatic call distribution apparatus is not terminated. Surely, the automatic call distribution apparatus may also send a Bye message to the call control apparatus to terminate the media session. In this way, after receiving the Bye message, the call control apparatus notifies the agent terminal to terminate the media session. In this case, the SIP session between the call control apparatus and the automatic call distribution apparatus is terminated.

During specific implementation, the method 300 may further include the following:

The automatic call distribution apparatus accepts registration of the call control apparatus.

During specific implementation, the method 300 may further include the following:

When the automatic call distribution apparatus detects that the call control apparatus is abnormal, the automatic call distribution apparatus deregisters the call control apparatus. In this way, when distributing a new incoming call later, the automatic call distribution apparatus does not distribute the new incoming call to the abnormal call control apparatus.

Figure 4:
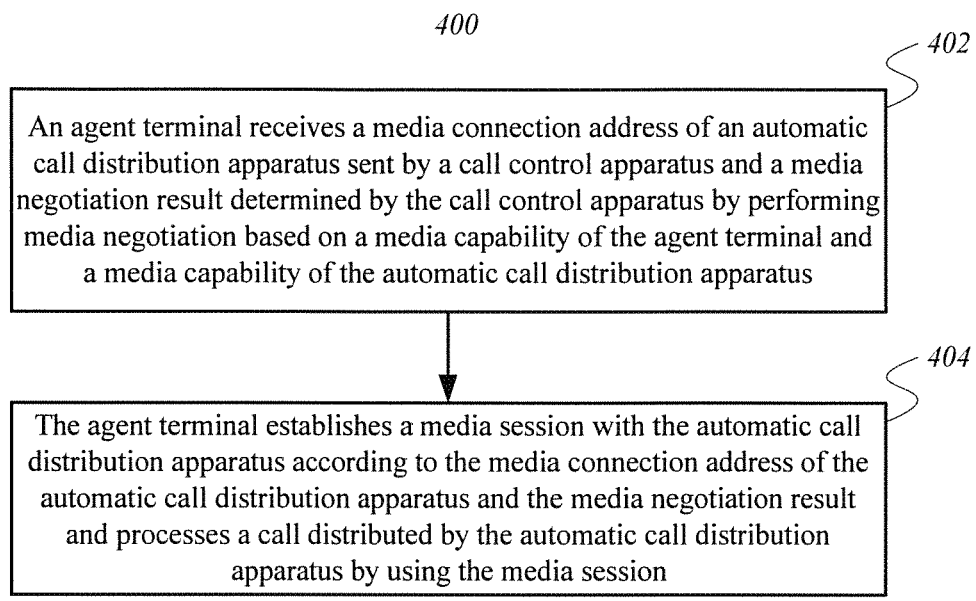
FIG. 4 is an exemplary flowchart of a call processing method according to an embodiment of the present invention.

FIG. 4 is an exemplary flowchart of a call processing method 400 according to an embodiment of the present invention.

Step 402: An agent terminal receives a media connection address of an automatic call distribution apparatus sent by a call control apparatus, and a media negotiation result determined by the call control apparatus by performing media negotiation based on a media capability of the agent terminal and a media capability of the automatic call distribution apparatus.

During specific implementation, step 402 may be further implemented specifically as follows: The agent terminal receives the media connection address and media capability of the automatic call distribution apparatus sent by the call control apparatus, performs the media negotiation based on the media capability of the agent terminal and the media capability of the automatic call distribution apparatus to determine a media negotiation result, and returns the media negotiation result to the call control apparatus. In this case, the media connection address of the agent terminal may be stored on the call control apparatus in advance or be returned to the call control apparatus with the media negotiation result.

Step 404: The agent terminal establishes a media session with the automatic call distribution apparatus according to the media connection address of the automatic call distribution apparatus and the media negotiation result and processes a call distributed by the automatic call distribution apparatus by using the media session. The process of establishing the media session is described in detail in the method 200, and therefore is not further described herein.

During specific implementation, the method 400 may further include the following:

The agent terminal sends a corresponding control request to the call control apparatus according to an operation instruction of an agent representative for the call, so that the call control apparatus controls the media session according to the control request. For example, when the agent representative sends a control request for terminating the call by using the agent terminal (for example, the agent representative hangs up), the call control apparatus terminates the media session. During specific implementation, the control request may be transferred by cloud communication between the agent terminal and the call control apparatus. During specific implementation, a process of terminating the media session may be as follows: When the agent representative performs an operation of terminating the call (for example, the agent representative hangs up), the agent terminal terminates the media session and sends the control request for terminating the call to the call control apparatus. Then, the call control apparatus notifies the automatic call distribution apparatus to terminate the media session. Specifically, if the call is controlled based on SIP, when receiving the control request from the agent terminal for terminating the call, the call control apparatus may send a ReInvite message to the automatic call distribution apparatus to notify the automatic call distribution apparatus to terminate the media session. In this case, the ReInvite message carries SDP parameters such as sendonly or inactive. In this way, after receiving the ReInvite message, the automatic call distribution apparatus terminates the media session. In this case, the SIP session between the call control apparatus and the automatic call distribution apparatus is not terminated. Surely, the call control apparatus may also send a Bye message to the automatic call distribution apparatus to terminate the media session. In this way, after receiving the Bye message, the automatic call distribution apparatus terminates the media session. In this case, the SIP session between the call control apparatus and the automatic call distribution apparatus is terminated.

Figure 5:
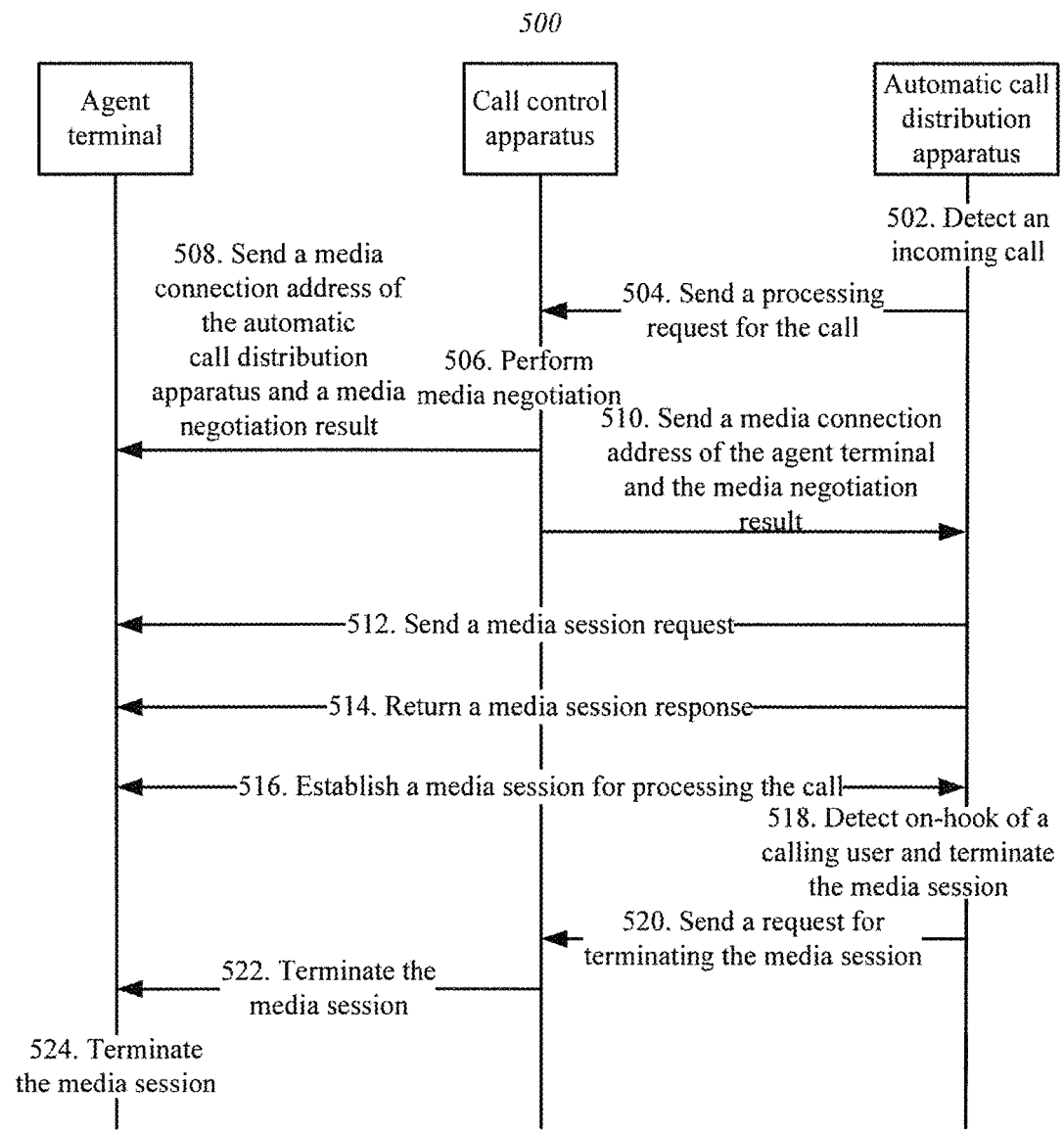
FIG. 5 is a signaling diagram of a call processing method according to an embodiment of the present invention.

FIG. 5 is a signaling diagram of a call processing method 500 according to an embodiment of the present invention.

Step 502: An automatic call distribution apparatus detects an incoming call.

Step 504: The automatic call distribution apparatus selects a call control apparatus from registered call control apparatuses and sends a processing request for the call to the call control apparatus. The processing request carries a media connection address and a media capability of the automatic call distribution apparatus.

Step 506: The call control apparatus that receives the processing request performs media negotiation based on a media capability of an agent terminal corresponding to the call control apparatus and the media capability of the automatic call distribution apparatus.

Step 508: The call control apparatus sends the media connection address of the automatic call distribution apparatus and a media negotiation result to the agent terminal to notify the agent terminal to accept a media session request that is initiated, by the automatic call distribution apparatus for which the media connection address is configured, to the agent terminal according to the media negotiation result, so that a media session is established with the automatic call distribution apparatus.

Step 510: The call control apparatus sends the media connection address of the agent terminal and the media negotiation result to the automatic call distribution apparatus to notify the automatic call distribution apparatus to initiate, according to the media negotiation result, the media session request to the agent terminal for which the media connection address is configured.

Step 512: The automatic call distribution apparatus sends the media session request to the agent terminal according to the received media connection address of the agent terminal and the media negotiation result.

Step 514: The agent terminal accepts the media session request from the automatic call distribution apparatus and returns a media session response.

Step 516: The automatic call distribution apparatus establishes the media session with the agent terminal and the agent terminal processes the call.

Step 518: The automatic call distribution apparatus detects on-hook of a calling user and terminates the media session.

Step 520: The automatic call distribution apparatus sends a request for terminating the media session to the call control apparatus.

Step 522: The call control apparatus notifies the agent terminal to terminate the media session.

Step 524: The agent terminal terminates the media session.

Figure 6:
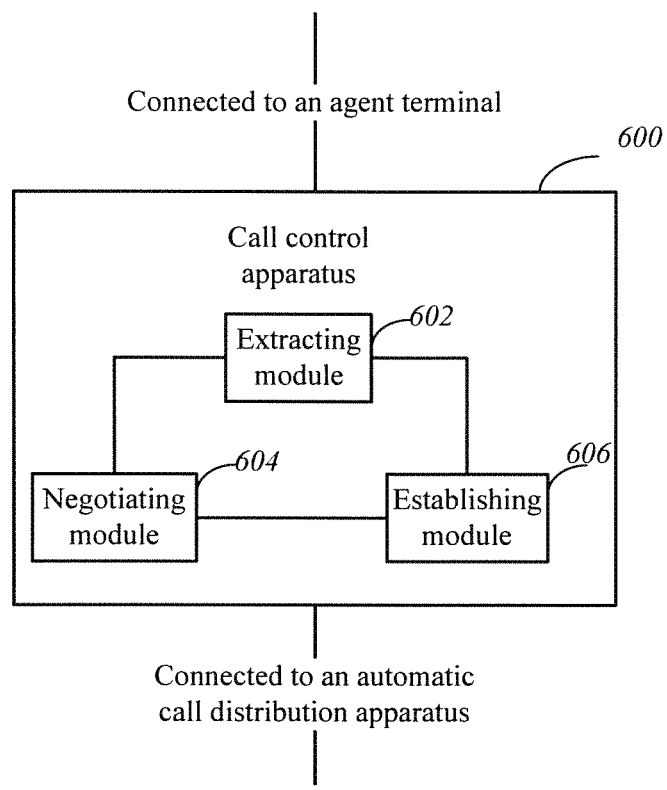
FIG. 6 is a schematic diagram of a logical structure of a call control apparatus according to an embodiment of the present invention.

FIG. 6 is a schematic diagram of a logical structure of a call control apparatus 600 according to an embodiment of the present invention. As shown in FIG. 6, the call control apparatus 600 separately connects to and communicates with an agent terminal and an automatic call distribution apparatus. The call control apparatus 600 includes an extracting module 602, a negotiating module 604, and an establishing module 606.

The extracting module 602 is configured to receive a processing request for a call, where the processing request is distributed by the automatic call distribution apparatus, and extract a media connection address and a media capability of the automatic call distribution apparatus carried in the processing request.

The negotiating module 604 is configured to perform media negotiation based on a media capability of the agent terminal and the media capability of the automatic call distribution apparatus.

During specific implementation, the negotiating module 604 is further configured as follows:

When the call control apparatus performs the media negotiation, the negotiating module 604 may store the media connection address and media capability of an agent terminal corresponding to the call control apparatus in advance, or may obtain the media connection address and media capability of the agent terminal from the agent terminal before performing the media negotiation based on the media capability of the agent terminal and the media capability of the automatic call distribution apparatus.

When the call control apparatus performs the media negotiation, for each media capability parameter, the negotiating module 604 calculates an intersection between a value of the media capability parameter in the media capability of the agent terminal and a value of the media capability parameter in the media capability of the automatic call distribution apparatus, and uses the intersection as a value of the media capability parameter in the media negotiation result. Therefore, the media negotiation result includes at least one media capability parameter. The value of each media capability parameter is an intersection between the value of the media capability parameter in the media capability of the agent terminal and the value of the media capability parameter in the media capability of the automatic call distribution apparatus.

Optionally, the negotiating module 604 may be further implemented specifically as follows: The negotiating module 604 performs the media negotiation based on the media capability of the agent terminal and the media capability of the automatic call distribution apparatus by using the agent terminal. That is, the negotiating module 604 sends the media connection address and media capability of the automatic call distribution apparatus to the agent terminal; the agent terminal performs the media negotiation based on the media capability of the agent terminal and the media capability of the automatic call distribution apparatus and returns the media negotiation result to the negotiating module 604. In this case, the media connection address of the agent terminal may be stored in the negotiating module 604 in advance or be returned to the negotiating module 604 with the media negotiation result. Therefore, in this case, the media negotiation is performed by the agent terminal.

When the agent terminal performs the media negotiation, for each media capability parameter, the agent terminal calculates an intersection between a value of the media capability parameter in the media capability of the agent terminal and a value of the media capability parameter in the media capability of the automatic call distribution apparatus, and uses the intersection as a value of the media capability parameter in the media negotiation result. Therefore, the media negotiation result includes at least one media capability parameter. The value of each media capability parameter is an intersection between the value of the media capability parameter in the media capability of the agent terminal and the value of the media capability parameter in the media capability of the automatic call distribution apparatus.

The establishing module 606 is configured to establish a media session between the agent terminal and the automatic call distribution apparatus according to the media connection address of the agent terminal, the media connection address of the automatic call distribution apparatus, and the media negotiation result, so that the agent terminal processes the call.

Specifically, when the call control apparatus performs the media negotiation, when establishing the media session, the establishing module 606 is specifically configured to: send the media connection address of the agent terminal and the media negotiation result to the automatic call distribution apparatus to notify the automatic call distribution apparatus to initiate, according to the media negotiation result, a media session request to the agent terminal for which the media connection address is configured. In addition, the establishing module 606 sends the media connection address of the automatic call distribution apparatus and the media negotiation result to the agent terminal to notify the agent terminal to accept the media session request that is initiated, by the automatic call distribution apparatus for which the media connection address is configured, to the agent terminal according to the media negotiation result, so that the media session is established with the automatic call distribution apparatus.

When the agent terminal performs the media negotiation, when establishing the media session, the establishing module 606 is specifically configured to: send the media connection address of the agent terminal and the media negotiation result to the automatic call distribution apparatus to notify the automatic call distribution apparatus to initiate, according to the media negotiation result, a media session request to the agent terminal for which the media connection address is configured. In this case, the agent terminal has performed the media negotiation; therefore, the establishing module 606 does not need to send the media connection address of the automatic call distribution apparatus and the media negotiation result to the agent terminal again. The agent terminal automatically accepts the media session request that is initiated, by the automatic call distribution apparatus for which the media connection address is configured, to the agent terminal according to the media negotiation result, so that the media session is established with the automatic call distribution apparatus.

During specific implementation, the call control apparatus 600 may further include:

a controlling module (not shown), configured to control the media session according to a control request for the call, where the control request is sent by the agent terminal. During specific implementation, the control request may be transferred by cloud communication between the agent terminal and the call control apparatus. For example, when the agent terminal initiates a control request for terminating the call, the controlling module terminates the media session. Specifically, when an agent representative performs an operation of terminating the call (for example, the agent representative hangs up), the agent terminal terminates the media session and sends a control request for terminating the call to the controlling module. Then, the controlling module notifies the automatic call distribution apparatus to terminate the media session. If the call is controlled based on SIP, when receiving the control request from the agent terminal for terminating the call, the controlling module may send a ReInvite message to the automatic call distribution apparatus to notify the automatic call distribution apparatus to terminate the media session. In this case, the ReInvite message carries SDP parameters such as sendonly or inactive. In this way, after receiving the ReInvite message, the automatic call distribution apparatus terminates the media session. In this case, the SIP session between the call control apparatus and the automatic call distribution apparatus is not terminated. Surely, the controlling module may also send a Bye message to the automatic call distribution apparatus to terminate the media session. In this way, after receiving the Bye message, the automatic call distribution apparatus terminates the media session. In this case, the SIP session between the call control apparatus and the automatic call distribution apparatus is terminated.

During specific implementation, the media negotiation result includes at least one media capability parameter. A value of each media capability parameter is an intersection between a value of the media capability parameter in the media capability of the agent terminal and a value of the media capability parameter in the media capability of the automatic call distribution apparatus.

During specific implementation, the call control apparatus 600 may further include:

a registering module (not shown), configured to register a call control apparatus with the automatic call distribution apparatus, where the registering module belongs to the call control apparatus.

During specific implementation, the call control apparatus 600 may further include:

a detecting module (not shown), when detecting that the agent terminal is abnormal, configured to notify the automatic call distribution apparatus to transfer a preset media stream to a calling user terminal of the call to play preset media (such as waiting music), and deregister the call control apparatus from the automatic call distribution apparatus. In this way, when receiving a new incoming call later, the automatic call distribution apparatus does not distribute the new incoming call to a call control apparatus corresponding to the abnormal agent terminal.

Figure 7:
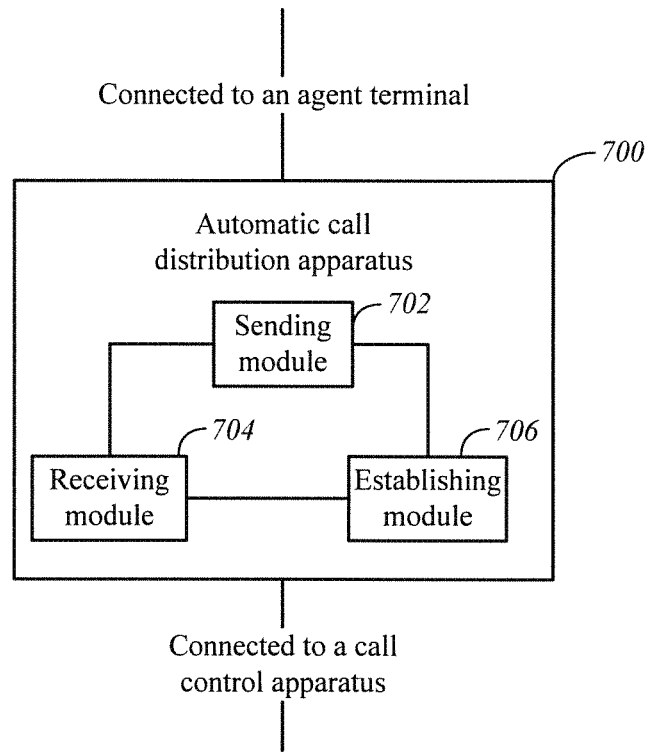
FIG. 7 is a schematic diagram of a logical structure of an automatic call distribution apparatus according to an embodiment of the present invention.

FIG. 7 is a schematic diagram of a logical structure of an automatic call distribution apparatus 700 according to an embodiment of the present invention. As shown in FIG. 7, the automatic call distribution apparatus 700 separately connects to and communicates with an agent terminal and a call control apparatus. The automatic call distribution apparatus 700 includes a sending module 702, a receiving module 704, and an establishing module 706.

The sending module 702 is configured to distribute a processing request for a call to the call control apparatus, where the processing request carries a media connection address and a media capability of the automatic call distribution apparatus.

During specific implementation, the sending module 702 is specifically configured to distribute a processing request for an incoming call to the call control apparatus when detecting the incoming call. Specifically, the sending module 702 selects a call control apparatus from registered call control apparatuses based on an automatic call distribution technology and distributes the processing request for the call to the call control apparatus.

The receiving module 704 is configured to receive a media connection address of the agent terminal returned by the call control apparatus and a media negotiation result determined by the call control apparatus by performing media negotiation based on a media capability of the agent terminal and the media capability of the automatic call distribution apparatus.

During specific implementation, the receiving module 704 may be further implemented specifically as follows: configured to receive the media connection address of the agent terminal returned by the call control apparatus and the media negotiation result that is determined by the agent terminal by performing the media negotiation based on the media capability of the agent terminal and the media capability of the automatic call distribution apparatus and is returned by the call control apparatus.

The establishing module 706 is configured to establish a media session with the agent terminal according to the media connection address of the agent terminal and the media negotiation result, so that the agent terminal processes the call.

During specific implementation, the automatic call distribution apparatus 700 may further include:

a controlling module (not shown), configured to control the media session according to a control request of a calling user terminal for the call. For example, when the calling user sends a control request for terminating the call by using the calling terminal (for example, the calling user hangs up), the controlling module terminates the media session. Specifically, when the calling user performs an operation of terminating the call (for example, the calling user hangs up), the controlling module terminates the media session and notifies the call control apparatus to instruct the agent terminal to terminate the media session. Then, the call control apparatus notifies the agent terminal to terminate the media session. If the call is controlled based on SIP, after terminating the media session, the controlling module may send a ReInvite message to notify the call control apparatus to instruct the agent terminal to terminate the media session. In this case, the ReInvite message carries SDP parameters such as sendonly or inactive. In this way, after receiving the ReInvite message, the call control apparatus notifies the agent terminal to terminate the media session. In this case, the SIP session between the call control apparatus and the automatic call distribution apparatus is not terminated. Surely, the controlling module may also send a Bye message to the call control apparatus to terminate the media session. In this way, after receiving the Bye message, the call control apparatus notifies the agent terminal to terminate the media session. In this case, the SIP session between the call control apparatus and the automatic call distribution apparatus is terminated.

During specific implementation, the automatic call distribution apparatus 700 may further include:

a registering module (not shown), configured to accept registration of the call control apparatus.

During specific implementation, the automatic call distribution apparatus 700 may further include:

a detecting module (not shown), configured to deregister the call control apparatus when detecting that the call control apparatus is abnormal. In this way, when distributing a new incoming call later, the automatic call distribution apparatus does not distribute the new incoming call to the abnormal call control apparatus.

Figure 8:
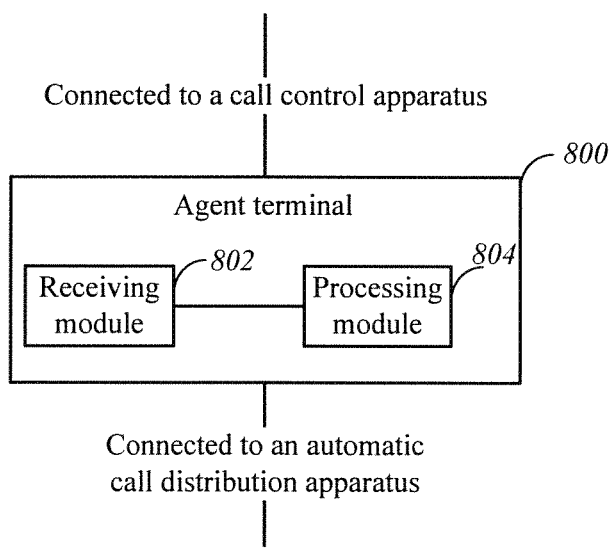
FIG. 8 is a schematic diagram of a logical structure of an agent terminal according to an embodiment of the present invention.

FIG. 8 is a schematic diagram of a logical structure of an agent terminal 800 according to an embodiment of the present invention. As shown in FIG. 8, the agent terminal 800 separately connects to and communicates with a call control apparatus and an automatic call distribution apparatus. The agent terminal 800 includes a receiving module 802 and a processing module 804.

The receiving module 802 is configured to receive a media connection address of the automatic call distribution apparatus sent by the call control apparatus and a media negotiation result determined by the call control apparatus by performing media negotiation based on a media capability of the agent terminal and a media capability of the automatic call distribution apparatus.

During specific implementation, the receiving module 802 may be further implemented specifically as follows: configured to receive the media connection address and media capability of the automatic call distribution apparatus sent by the call control apparatus, perform the media negotiation based on the media capability of the agent terminal and the media capability of the automatic call distribution apparatus, and return the media negotiation result to the call control apparatus. In this case, the media connection address of the agent terminal may be stored on the call control apparatus in advance or be returned by the receiving module 802 to the call control apparatus with the media negotiation result.

The processing module 804 is configured to establish a media session with the automatic call distribution apparatus according to the media connection address of the automatic call distribution apparatus and the media negotiation result and process a call distributed by the automatic call distribution apparatus by using the media session.

Specifically, when the call control apparatus performs the media negotiation, the call control apparatus sends the media connection address of the agent terminal and the media negotiation result to the automatic call distribution apparatus to notify the automatic call distribution apparatus to initiate, according to the media negotiation result, a media session request to the agent terminal for which the media connection address is configured. In addition, the call control apparatus sends the media connection address of the automatic call distribution apparatus and the media negotiation result to the processing module 804 to notify the processing module 804 to accept the media session request that is initiated, by the automatic call distribution apparatus for which the media connection address is configured, to the agent terminal according to the media negotiation result, so that the media session is established with the automatic call distribution apparatus.

When the agent terminal performs the media negotiation, the call control apparatus sends the media connection address of the agent terminal and the media negotiation result to the automatic call distribution apparatus to notify the automatic call distribution apparatus to initiate, according to the media negotiation result, a media session request to the agent terminal for which the media connection address is configured. In this case, the agent terminal has performed the media negotiation; therefore, the call control apparatus does not need to send the media connection address of the automatic call distribution apparatus and the media negotiation result to the processing module 804 again. The processing module 804 automatically accepts the media session request that is initiated, by the automatic call distribution apparatus for which the media connection address is configured, to the agent terminal according to the media negotiation result, so that the media session is established with the automatic call distribution apparatus.

During specific implementation, the agent terminal 800 may further include:

a controlling module (not shown), configured to send a corresponding control request to the call control apparatus according to an operation instruction of an agent representative for the call so that the call control apparatus controls the media session according to the control request. For example, when the agent representative sends a control request for terminating the call by using the agent terminal (for example, the agent representative hangs up), the call control apparatus terminates the media session. During specific implementation, the control request may be transferred by cloud communication between the agent terminal and the call control apparatus. During specific implementation, when the agent representative performs an operation of terminating the call (for example, the agent representative hangs up), the controlling module terminates the media session and sends the control request for terminating the call to the call control apparatus. Then, the call control apparatus notifies the automatic call distribution apparatus to terminate the media session. Specifically, if the call is controlled based on SIP, when receiving the control request from the agent terminal for terminating the call, the call control apparatus may send a ReInvite message to the automatic call distribution apparatus to notify the automatic call distribution apparatus to terminate the media session. In this case, the ReInvite message carries SDP parameters such as sendonly or inactive. In this way, after receiving the ReInvite message, the automatic call distribution apparatus terminates the media session. In this case, the SIP session between the call control apparatus and the automatic call distribution apparatus is not terminated. Surely, the call control apparatus may also send a Bye message to the automatic call distribution apparatus to terminate the media session. In this way, after receiving the Bye message, the automatic call distribution apparatus terminates the media session. In this case, the SIP session between the call control apparatus and the automatic call distribution apparatus is terminated.

A person of ordinary skill in the art may understand that all or a part of the steps of the foregoing methods may be implemented by a program instructing relevant hardware. The program may be stored in a computer readable storage medium. The storage medium includes: a ROM, a RAM, and an optical disc.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A call processing method based on desktop cloud technology, the method comprising:
   receiving, by a call control apparatus deployed on a cloud server, a processing request for a call, wherein the processing request is distributed by an automatic call distribution apparatus, and carries a media capability of the automatic call distribution apparatus;
   performing, by the call control apparatus, media negotiation based on a media capability of an agent terminal connected to the cloud server and the media capability of the automatic call distribution apparatus, the call control apparatus is a virtual machine allocated by the cloud server to the agent terminal;
   sending, by the call control apparatus, a media negotiation result to the agent terminal;
   receiving, by the agent terminal, a media session request from the automatic call distribution apparatus, and establishing, by the agent terminal, a media session between the agent terminal and the automatic call distribution apparatus according to the media negotiation result; and
   processing, by the agent terminal, a call distributed by the automatic call distribution apparatus by using the media session.

2. The method according to claim 1, wherein processing, by the agent terminal, a call distributed by the automatic call distribution apparatus by using the media session comprises:
   processing, by the agent terminal, streaming media of the call by using the media session.

3. The method according to claim 1, further comprising:
   sending, by the agent terminal, a control request for the call to the call control apparatus; and
   controlling, by the call control apparatus, the media session according to the control request for the call.

4. The method according to claim 1, wherein:
   the media negotiation result comprises at least one media capability parameter; and a value of each media capability parameter is an intersection between a value of the media capability parameter in the media capability of the agent terminal and a value of the media capability parameter in the media capability of the automatic call distribution apparatus.

5. The method according to claim 2, wherein:

the control request is a request for terminating the call; and controlling, by the call control apparatus, the media session according to the control request for the call comprises:

notifying, by the call control apparatus, the automatic call distribution apparatus to terminate the media session.

6. The method according to claim 5, wherein notifying, by the call control apparatus, the automatic call distribution apparatus to terminate the media session comprises:

sending, by the call control apparatus, a ReInvite message or a Bye message to the automatic call distribution apparatus to terminate the media session.

\* \* \* \* \*